United States Patent [19]

Pond

[11] Patent Number: 4,697,829
[45] Date of Patent: Oct. 6, 1987

[54] PIPE CONNECTION JOINTS

[75] Inventor: Richard J. Pond, Watledge, England

[73] Assignee: R J Pond Limited, Nailsworth, England

[21] Appl. No.: 888,402

[22] Filed: Jul. 23, 1986

[30] Foreign Application Priority Data

Jul. 31, 1985 [GB] United Kingdom ............... 8519279
Dec. 4, 1985 [GB] United Kingdom ............... 8529895

[51] Int. Cl.$^4$ ............................................. F16L 55/00
[52] U.S. Cl. ..................................... 285/18; 285/299; 285/302; 285/381
[58] Field of Search ............... 285/18, 300, 301, 302, 285/299, 381

[56] References Cited

U.S. PATENT DOCUMENTS

| | | | |
|---|---|---|---|
| 2,564,670 | 8/1951 | Bratt | 285/381 X |
| 2,992,479 | 7/1961 | Musser et al. | 285/381 X |
| 3,822,412 | 7/1974 | Carlin et al. | 285/302 X |
| 3,923,324 | 12/1975 | Cruickshank et al. | 285/381 X |
| 4,011,918 | 3/1977 | Jurgens | 285/381 X |

Primary Examiner—Richard J. Scanlan, Jr.
Attorney, Agent, or Firm—Collard, Roe & Galgano

[57] ABSTRACT

A pipe connection joint comprises two coaxial tubular joint members which are telescopically engaged, one within the other. The outer joint member has a bore, and the inner joint member a through bore, of the same diameter as that of the pipeline with which the joint is to be used. The inner joint member is received in a counterbore in the outer joint member, being an interference fit therein over an interface region to provide both a seal and a friction lock precluding relative axial separation of the joint members under internal working pressure. One of the joint members incorporates an externally connectible duct which leads to the interface region, whereby fluid under pressure can be introduced through the duct to relieve said friction lock.

17 Claims, 2 Drawing Figures

PIPE CONNECTION JOINTS

BACKGROUND OF THE INVENTION

1. Field of the Invention

The invention relates to pipe connection joints, particularly but by no means exclusively for sea-bed pipework.

2. Description of the Prior Art

There is frequently a requirement for a non-weldable but permanent pipe connection joint in both subsea and surface applications. In addition, for subsea applications in particular, it is desirable that a pipe connection joint should also possess the capability of telescoping to allow disconnection of an adjacent connector.

In the installation of a subsea template or manifold system on the sea-bed, sea-bed flowlines have to be laid from either a platform or a land installation. With a deep water application it is usual, because of the complexity of the operation, to pull a line into its final position and, after retaining it at the junction, to effect the final connection to the manifold or template pipework in a separate operation. This final connection can be effected in a number of ways, but in all cases it is usual to spread the pipe ends apart in order to interpose seals or a seal carrier and then to pull them together and pressure clamp the pipe ends.

Thus provisions have to be made to allow for spreading apart of the pipe ends when the final connection is made. For this purpose telescopic joints have in the past been proposed, and although such joints are inherently attractive they have attracted severe criticism on two main grounds. Firstly, the resilient seals which have been necessary to prevent leakage could not be guaranteed to remain effective over long periods and, secondly, the joints generally had to be restrained to prevent end pressure parting.

The present state of the art relating to subsea installations generally avoids the problems with telescopic joints by utilising either flexible pipe spools or flex loops within the manifold pipework structure which deflect appropriately to allow spreading of the pipe ends to be connected. As will be appreciated this requires large pipe bends to be incorporated to accommodate the required deflection without over-stressing of the pipe loops. The desired result can be achieved with outboard sea-bed flowline deflection, and although this reduces the size of the template and manifold structure the successful deflecting back of the flowline to make the final connection is not predictable, and indeed the success of this operation cannot be guaranteed.

SUMMARY OF THE INVENTION

The present invention has for its object to provide a metal sealing pipe connection joint which, for subsea applications, can be designed as a telescopic pipe connection joint which successfully overcomes the foregoing criticisms of prior telescopic joints for such applications.

To this end, according to the invention, a pipe connection joint comprises two coaxial tubular joint members which are telescopically engaged one within the other with an interference fit which provides both a seal against leakage from the joint and a friction lock precluding relative axial separation of the joint members under the intended working pressure conditions, one of the joint members incorporating an externally connectible duct leading to the interface of the joint members whereby fluid under pressure can be introduced to relieve said friction lock and allow relative telescopic movement of the joint members.

The interference fit of one of the joint members within the other may be pressure assisted, with an increase in the internal working pressure tending to expand the inner joint member at the interface and thus increasing both the sealing efficiency and the friction lock.

Seals may be fitted at each end of the interface region which provides the interference fit. These seals contain the fluid pressure introduced via said duct to relieve the friction lock, and they may be elastomeric or metallic seals. In the latter case the seals or sealing surfaces may be machined from the joint members themselves. Such seals but not the plain sealing surfaces are incidental during normal working operation of the joint when the interference seal is operative.

Preferably the outer joint member is counterbored with a stepped counterbore which receives the inner member.

With a joint which is not intended to be telescopically extendable for connection and contractible for disconnection, substantially the entire length of the counterbore preferably provides the interference fit, with the inner joint member having a complementary fitting outer surface. In this case the stepped formation facilitates initial assembly of the joint, as the inner and outer members may be partly interengaged before interference occurs, and said seals are preferably respectively provided at the inner end of the inner joint member and the outer end of the outer joint member.

When the joint is telescopically variable in length, when an appropriate fluid pressure is externally applied via said duct, an outer portion of the counterbore in the outer joint member may provide the required interference fit with the inner joint member having a reduced diameter inner end sleeve portion which is a free sliding fit in an inner portion of the counterbore. This enables the parts of the bores of the two joint members exposed when the joint is fully compressed to be of a common diameter, and provides in the working extended condition an almost continuous bore which allows pigs to be passed through the joint without losing the pig total motive seal contact with the bore. A wiper and protection sealing ring is preferably fitted to prevent ingress of solids between the counterbore and said sleeve portion, and a secondary wiper and protection sealing ring may be disposed at the inner end of said interface region.

Other features of the invention will be apparent from the following description, drawings and claims, the scope of the invention not being limited to the drawings themselves as the drawings are only for the purpose of illustrating ways in which the principles of the invention can be applied. Other embodiments of the invention utilising the same or equivalent principles may be used and structural changes may be made as desired by those skilled in the art without departing from the present invention and the purview of the appended claims.

DESCRIPTION OF THE PREFERRED EMBODIMENTS

Figure 1:
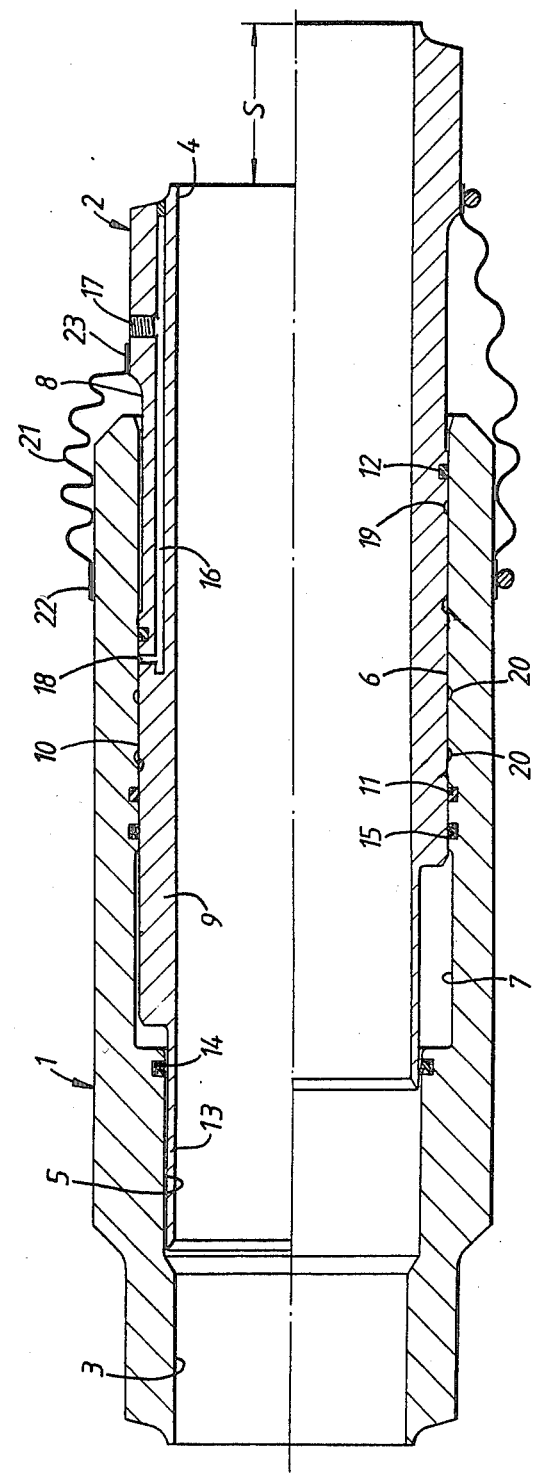
FIG. 1 illustrates a telescopically extendable pipe connection joint, especially suitable for use in a subsea installation /

The top half of FIG. 1 illustrates the pipe connection joint shown therein fully compressed, whereas the bottom half shows the joint in a fully extended working condition.

This joint comprises two coaxial tubular joint members 1 and 2 which are telescopically engaged, one within the other. The outer joint member 1 has a bore 3 of the same diameter as that of the pipeline with which the joint is to be used, and the inner joint member 2 has a through bore 4 of the same diameter. A stepped counterbore of the joint member 1 presents an intermediate diameter portion 5 and a larger diameter outer end portion 6. This counterbore formed in the member 1 is relieved over an intermediate annular groove 7.

The inner joint member 2 has an outer surface of complementary stepped form. Inwardly of a relief groove 8 the joint member 2 has a sealing portion 9 which is an interference fit within the outer counterbore section 6, and this fit provides both a seal against leakage from the joint and a friction lock which normally precludes relative telescopic movement of the joint members 1 and 2. In particular, it prevents the internal working pressure from blowing the joint apart.

At each end of the interface region 10 which provides the interference fit resilient seals 11 and 12 are provided between the joint members 1 and 2, the inner seal 11 being let into the joint member 1 and the outer seal 12 being let into joint member 2. The inner joint member 2 has an inner end sleeve portion 13 which is a free sliding fit in the intermediate diameter portion 5 of the outer joint member 1. This enables the normally exposed bore portions—see lower half of FIG. 1—to present an almost continuous bore which allows pigs to be passed through without losing the pig motive seal contact with the bores 3 and 4, as the thin sleeve portion 13 bridges the groove 7.

A wiper and protection seal 14 is provided between the sleeve portion 13 and outer joint member 1 at the outer end of the bore portion 5. This seal 14 is let into the outer joint member 1 and positioned so that it is disposed close to the inner or free end of the sleeve portion 13 at the full joint extension, as shown in the bottom half of FIG. 1. A second wiper and protection seal 15 which is let into the outer joint member 1 close to, and on the inner side of, the seal 11 provides secondary protection for the interface region 10.

A duct 16 in the inner joint member 2 has an external connection at 17 and leads to a port 18 which communicates with a peripheral groove 19 in the interface region 10. This duct 16 can thus be supplied with pressure fluid which forces the joint members 1 and 2 apart at the interface region 10, thereby relieving the interference fit and allowing relative telescopic 'stroking' movement of the joint members 1 and 2, the full extension range or stroke of the joint being indicated by reference S.

The described pipe connection joint is intended to be fabricated into a sea-bed pipework arrangement close to the inboard/outboard sealed connection of a subsea template or manifold system. On installation one of the joint members 1 and 2 is welded to the template of manifold pipework, and the other to the corresponding connecting flange or hub. It is probable that the inboard pipework will require to be retracted when pulling in the outboard side flowline. With the outboard hub locked down a connection tool can be run to place and locates on both inboard and outboard hubs, at the same time plugging into a hydraulic stroking probe receiver. This receiver, which is not illustrated, can be permanently piped to the joint pressure stroking connection 17.

Although this joint is designed primarily for use in deep-sea locations as a diverless remote connection, it can also be used in shallower waters in conjunction with diver assistance.

To allow stroking of the joint a suitable high pressure is applied to the stroking port 18, causing the joint members 1 and 2 to be pressured apart thus allowing free relative telescopic movement out to the extended position. Once the pipe connection is finally coupled up the pipe joint can be pressure tested by pressuring through the stroking port 18 to a pressure equal to the working internal pressure. As the interference fit is maintained through to the resilient stroking seal 12, the pipe joint pressure containment is tested on faces adjacent the stroking inlet port groove 19. Further peripheral grooves 20 are provided in the joint members 1 and 2 at the interface region 10. These assist distribution of the pressure fluid in this region and thus act as anti-locking grooves to equalise pressure when unlocking the joint by application of external pressure to the connection 17.

It will be appreciated that in an installation it is likely that both the inboard and the outboard pipework will be positively locked down. In that case the friction lock resistance provided by the interference fit between the joint members 1 and 2 has only to cater for the difference in pressure area of the pipe bore and sliding interface diameter, and not the total bore pressure area plus the inner tube differential area.

Although the joint of FIG. 1 has been described as installed in a template or manifold system, it will further be appreciated that it also provides advantages for the mid-connection of sea-bed flowlines. In this case the joint allows tow out of complete lengths of pipeline, which lengths can be joined remotely on the sea-bed without the use of large expanding pipe loops.

Apart from its general simplicity the joint provides considerable flexibility which allows the final operating position to be within a considerable tolerance band whilst still working effectively. Any tendency for the pipe to move under pressure end load will only enhance the presetting load of the flowline connection. As compared with the present normal practice in the art, the joint of the invention takes the place of an equivalent 360° bend having a diameter at least four times the length of the present joint.

A flexible boot 21 is fitted to protect the surface of the joint member 2 which enters the member 1 during stroking of the joint and which would otherwise be exposed. This avoids encrustation deposits on that surface which would impede stroking after a period in service on the sea-bed. The boot 21 is clamped at one end around the joint member 1 by a clamp ring 22, and at the other end around the joint member 2 by a clamp ring 23.

Figure 2:
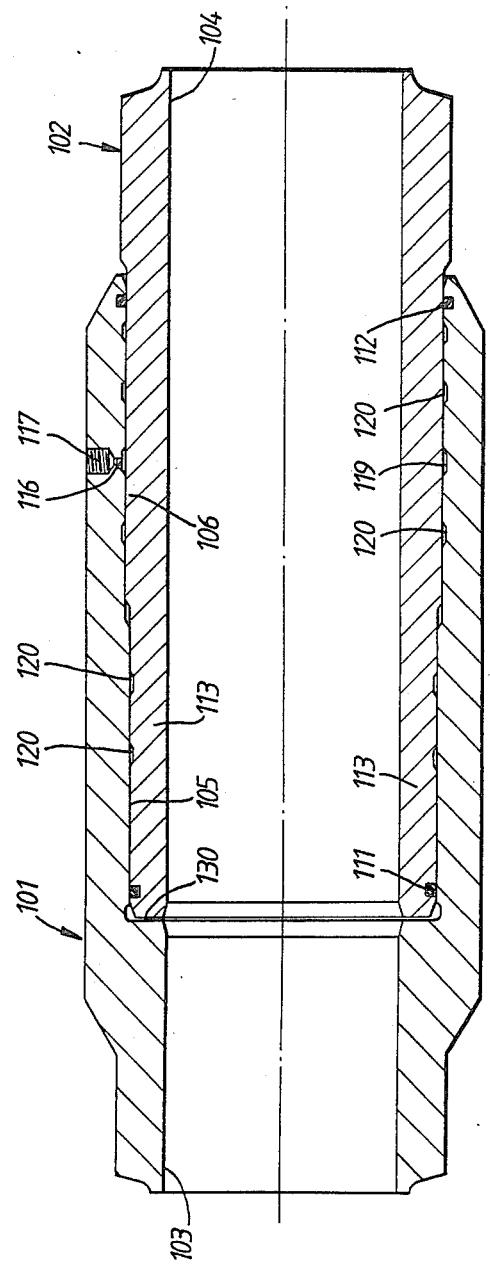
FIG. 2 illustrates a non-extendable pipe connection joint suitable for use in subsea and surface installations.

The embodiment of FIG. 2 is fundamentally similar to that of FIG. 1 but is simplified by the omission of the capability of telescopic extension under pressure. Similar basic parts of this embodiment are identified by the same reference numerals as those used in FIG. 1 but increased by '100'. The outer and inner joint members 101 and 102 have through bores 103 and 104 of common diameter matching that of the pipeline in which the joint is to be fitted. In the assembled condition which is illustrated the inner end of the member 102 abuts a step 130 in the outer member 101 at the inner end of the stepped counterbore 105,106 in the latter. In this case the intermediate groove 7 of FIG. 1 is omitted, and the members 101 and 102 are an interference fit over the full length of the counterbore, that is over both portions 105 and 106 thereof.

Thus the resilient seals 111 and 112 which are respectively positioned at the ends of the interface region providing the interference fit are comparatively widely spaced. The inner seal 111 is now mounted on the inner member 102 at the inner end thereof, and the outer seal 112 is mounted in the outer member 101 at the outer end thereof. The counterbore portions 105 and 106 are of substantially equal effective length and the comparatively short radial duct 116 and external connection 117 are formed in the outer member 101 and positioned centrally of the counterbore portion 106. The peripheral groove in the interface region, with which the duct 116 communicates, is accordingly now formed in the outer joint member 101. The further spaced grooves 120 which assist distribution of externally applied fluid pressure at the interface region are now formed some in the counterbore portion 106 and some on the now-fitting smaller diameter inner end portion 113 of the inner joint member 102.

To assemble the connection joint the inner member 102 is partially inserted into the outer member 101 until the inner seal 111 enters the counterbore portion 105, when the outer seal 112 also operatively engages the inner member 102. Fluid pressure is now applied externally, through the connection 117 and duct 116 between the members 101 and 102. This pressure is contained by the seals 111 and 112 and spreads the engaged tubular portions of the joint members radially apart, expanding the member 101 and contracting the member 102. This allows the members to be pushed fully together to the normal operative position illustrated in FIG. 2, and on release of the applied pressure a permanent metal sealing joint is obtained, providing a metal seal and friction lock by utilising a compound tubular arrangement with an interference fit in accordance with the invention.

The joint once assembled can be pressure tested through the external connection 117 at a lower pressure than that required to separate the joint members, that is at the internal working pressure of the joint. A pressure assisted seal is obtained, as with the internal working pressure applied a greater pressure sealing and friction lock is provided by the action of increasing the hoop stress in the tubular portion of the outer member 101 which surrounds the inner member 102.

If the joint is subsequently required to be broken, fluid pressure is applied via the external connection 117 to force the joint members 101 and 102 apart radially, thus allowing them to be separated axially. Apart from simplified construction, this connection joint possesses the general advantages of speed of connection (and disconnection), the ability to pressure test the joint externally, and a dimensionally low profile.

In either of the described embodiments the inner resilient seal 11 or 111 may if desired be omitted. In this case application of a test pressure to the external connection 17 or 117 provides a positive check, if the joint "holds" this pressure, of the integrity of the interference seal between the joint members 1 and 2. If suited to installation procedures, the duct 16 of the first embodiment may alternatively be provided by a radial bore through the outer joint member 1, as with the corresponding duct 116 of the embodiment illustrated in FIG. 2.

What is claimed is;

1. A pipe connection joint comprising first and second coaxial tubular joint members, said joint members being in telescopic mutual engagement with an inner end portion of said first joint member surrounding an inner end portion of said second joint member so that the first joint member partially overlaps the second joint member, each of said joint members being adapted at an outer end for connection in a pipe-line and, over a cylindrical interface region disposed within an overlapped length of said second joint member, the second joint member being an interference fit within the first joint member, said interference fit providing a friction lock which prevents axial separation of the joint members when the joint is subject to internal working fluid pressure and also providing a seal against leakage from the joint, and an externally connectible duct which is formed in one of said joint members and terminates at said interface region, so that fluid under pressure can be introduced between said joint members at said interface region via said duct to relieve said friction lock to thereby allow relative telescopic movement of the joint members.

2. A pipe connection joint according to claim 1, wherein seals are provided at each end of said interface region, said seals being operative to contain fluid pressure introduced via said duct to relieve said friction lock.

3. A pipe connection joint according to claim 2, wherein said seals are elastomeric seals.

4. A pipe connection joint according to claim 1, wherein said duct communicates with a peripheral groove at said interface region, said groove being formed in said one of said joint members in which the duct is incorporated.

5. A pipe connection joint according to claim 1, wherein said first joint member is counterbored with a stepped counterbore.

6. A pipe connection joint according to claim 5, wherein substantially the entire length of said stepped counterbore provides said interference fit, said second joint member having a complementary fitting outer cylindrical surface.

7. A pipe connection joint according to claim 5, wherein seals at each end of said interface region are respectively provided adjacent the inner end of said second joint member and adjacent the outer end of said first joint member.

8. A pipe connection joint according to claim 6, wherein said duct is incorporated in said first joint member.

9. A pipe connection joint according to claim 5, wherein the joint is telescopically variable in length, when an appropriate fluid pressure is externally applied via said duct, and an outer portion of said counterbore in said first joint member provides said interference fit with said second joint member which has a reduced diameter inner end sleeve portion which is a free sliding fit in an inner portion of the counterbore.

10. A pipe connection joint according to claim 9, wherein a wiper and protection seal is fitted to prevent ingress of solids between said counterbore and said sleeve portion of said second joint member.

11. A pipe connection joint according to claim 10, wherein a secondary wiper and protection seal is fitted at an inner end of said interface region.

12. A pipe connection joint according to claim 9, wherein said duct is incorporated in said second joint member.

13. A pipe connection joint according to claim 9, wherein a flexible boot is connected between said joint members and surrounds a portion of said second joint member which would otherwise be exposed in an extended working condition of the joint, said portion of the second joint member being received within said first joint member when the joint is fully compressed.

14. A pipe connection joint according to claim 1, wherein said interface region providing said interference fit of the joint members is grooved to facilitate distribution throughout that region of a fluid introduced under pressure via said duct to relieve said friction lock.

15. A pipe connection joint comprising first and second coaxial tubular joint members, said joint members being in telescopic mutual engagement with an inner end portion of said first joint member surrounding an inner end portion of said second joint member so that the first joint member partially overlaps the second joint member, each of said joint members being adapted at an outer end for connection in a pipe-line and, over a cylindrial interface region disposed within an overlapped length of said second joint member, the second joint member being an interference fit within the first joint member, said interference fit providing a friction lock which prevents axial separation of the joint members when the joint is subject to internal working fluid pressure and also providing a seal against leakage from the joint which is operative over a range of overall telescopic lengths of the joint, and an externally connectible duct which is formed in one of said joint members and terminates at a peripheral groove in said one joint member at said interface region, so that fluid under pressure can be introduced into said interface region via said duct to relieve said friction lock to thereby allow relative telescopic movement of the joint members.

16. A pipe connection joint comprising first and second coaxial tubular joint members, said joint members having through bores of substantially the same diameter and being in telescopic mutual engagement with an annular reduced diameter inner end portion of said second joint member received within an inner end annular counterbore of said first joint member so that the first joint member partially overlaps the second joint member, each of said joint members being adapted at an outer end for connection in a pipe-line and, over a cylindrical interface region disposed within said counterbore, the second joint member being an interference fit within the first joint member, said interference fit providing a friction lock which prevents axial separation of the joint members when the joint is subject to internal working fluid pressure and also providing a seal against leakage from the joint, and an externally connectible duct which is formed in one of said joint members and terminates at a peripheral groove at said interface region, so that fluid under pressure can be introduced via said duct to relieve said friction lock by radial separation of the joint members to thereby allow relative telescopic movement of the joint members.

17. A pipe connection joint comprising first and second coaxial tubular joint members, said joint members being in telescopic mutual engagement with an inner end portion of said first joint member surrounding an inner end portion of said second joint member so that the first joint member partially overlaps the second joint member, each of said joint members being adapted at an outer end for connection in a pipe-line and, over a cylindrical interface region disposed within an overlapped length of said second joint member, the second joint member being an interference fit within the first joint member, said interference fit providing a friction lock which prevents axial separation of the joint members when the joint is subject to internal working fluid pressure and also providing a seal against leakage from the joint, an externally connectible duct which is formed in one of said joint members and terminates at said interface region, so that fluid under pressure can be introduced via said duct to relieve said friciton lock by radial separation of the joint members within said interface region to thereby allow relative telescopic movement of the joint members, and spaced seals disposed within said overlapped length of the second joint member and respectively disposed adjacent opposite ends of said interface region.

* * * * *